United States Patent
Mombourquette

(10) Patent No.: US 10,958,775 B2
(45) Date of Patent: Mar. 23, 2021

(54) SPEECH TO DUAL-TONE MULTIFREQUENCY SYSTEM AND METHOD

(71) Applicant: Mitel Networks ULC, Vancouver (CA)

(72) Inventor: Darren Mombourquette, Nepean (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 16/215,212

(22) Filed: Dec. 10, 2018

(65) Prior Publication Data
US 2020/0186637 A1    Jun. 11, 2020

(51) Int. Cl.
*H04M 1/725* (2006.01)
*G10L 15/22* (2006.01)

(52) U.S. Cl.
CPC ......... *H04M 1/72522* (2013.01); *G10L 15/22* (2013.01); *G10L 2015/223* (2013.01); *H04M 2201/40* (2013.01); *H04M 2250/74* (2013.01); *H04Q 2213/13405* (2013.01)

(58) Field of Classification Search
USPC .................................................. 379/201.01
See application file for complete search history.

(56) References Cited

U.S. PATENT DOCUMENTS

| | | | |
|---|---|---|---|
| 7,110,519 B2* | 9/2006 | Bezner | H04Q 3/0029 379/207.02 |
| 7,386,103 B1* | 6/2008 | Chahal | H04M 3/493 379/76 |
| 9,485,347 B2 | 11/2016 | Gupta et al. | |
| 2002/0091778 A1* | 7/2002 | Hosoi | H04L 51/066 709/206 |
| 2005/0208977 A1* | 9/2005 | Mori | H04M 1/2748 455/564 |
| 2008/0144610 A1* | 6/2008 | Kakiuchi | H04L 12/66 370/352 |
| 2011/0188644 A1* | 8/2011 | Skinner | H04M 1/64 379/88.04 |
| 2015/0215455 A1* | 7/2015 | Perotti | H04M 3/493 379/88.01 |
| 2018/0241880 A1* | 8/2018 | Chug | H04M 1/72569 |
| 2018/0338037 A1 | 11/2018 | Ly et al. | |

FOREIGN PATENT DOCUMENTS

WO    WO 0067497    9/2000

\* cited by examiner

*Primary Examiner* — Maria El-Zoobi

(57) ABSTRACT

A method and system for converting speech to tones and transmitting the tones to another device are disclosed. The method can include determining when a communication is initiated, automatically launching a speech-to-tone application on the communication device, determining when pre-defined words are spoken, performing one or more of converting the pre-defined words to a signal comprising a tone using the communication device and converting a stored key sequence to a signal comprising a tone using the communication device, and transmitting the signal to another device. The system can include one or more devices to perform the method.

21 Claims, 3 Drawing Sheets

SPEECH TO DUAL-TONE MULTIFREQUENCY SYSTEM AND METHOD

FIELD OF THE INVENTION

The present disclosure generally relates to electronic communication methods and systems. More particularly, the disclosure relates to electronic communication methods and systems that employ dual-tone multifrequency technology.

BACKGROUND OF THE DISCLOSURE

Interactive voice response (IVR) systems allow users to interact with a computer via use of dual-tone multifrequency (DTMF) tones input on a user's device and/or via speech recognition. IVR systems often provide pre-recorded or dynamically generated audio information to a user. Users can respond to the audio information by selecting numbers on a keypad of the user's device, such as a phone, or, if the IVR is capable of speech recognition, by speaking the response. In the case of selecting numbers (e.g., using a keypad on the device or phone application), the user device can send a signal, comprising DTFM tones, corresponding to the selected number(s), to the IVR.

Responding to an IVR by selecting numbers on a keypad may be undesirable in a number of cases. For example, users may not want to select numbers on a keypad while driving, operating machinery, in other situations where the user does not want the added distraction, and the like. And, using a keypad to respond to an IVR request may be dangerous and/or undesirably cumbersome. Further, some users may be tactile challenged and have a difficult time selecting numbers on a keypad.

To overcome some of these problems, some systems allow a user to select a key, e.g., 0, on a keypad to speak to an operator. Other systems may detect long no response times and switch the call to an operator if the period of no response is longer than a predetermined time. While such techniques can work in some situations, the techniques can require undesired wait times for the user, expense for the service provider, and in the first situation, still require activation of a key on a device. For at least these reasons, improved methods and systems that allow users to respond to IVR requests, particularly to IVR requests that do not recognize voice commands, are desired.

Upgrading IVR systems that do not include speech recognition can be expensive and time consuming. Accordingly, improved systems and methods that can economically address the issues noted above are further desired.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems that allow a user to respond to a dual-tone multifrequency (DTMF) system, such as an interactive voice response (IVR) system using voice commands, wherein a user communication device converts speech to dual-tone multifrequency (DTMF) tones. While the ways in which the present disclosure addresses various drawbacks of prior systems and methods are described in more detail below, in general, various systems and methods described herein can be implemented without requiring changes to or upgrades of legacy DTMF-enabled systems. Further, as set forth in more detail below, the methods and systems described herein are not limited to particular DTMF-enabled systems, but rather can be used with any DTMF-enabled system. Exemplary systems and methods can convert speech into DTMF tones during a call and on a user device and send the DTMF tones corresponding to the spoken words to the DTMF-enabled system. This allows users to respond to DTMF-enabled systems without the distraction or burden of pressing keys.

Figure 1:
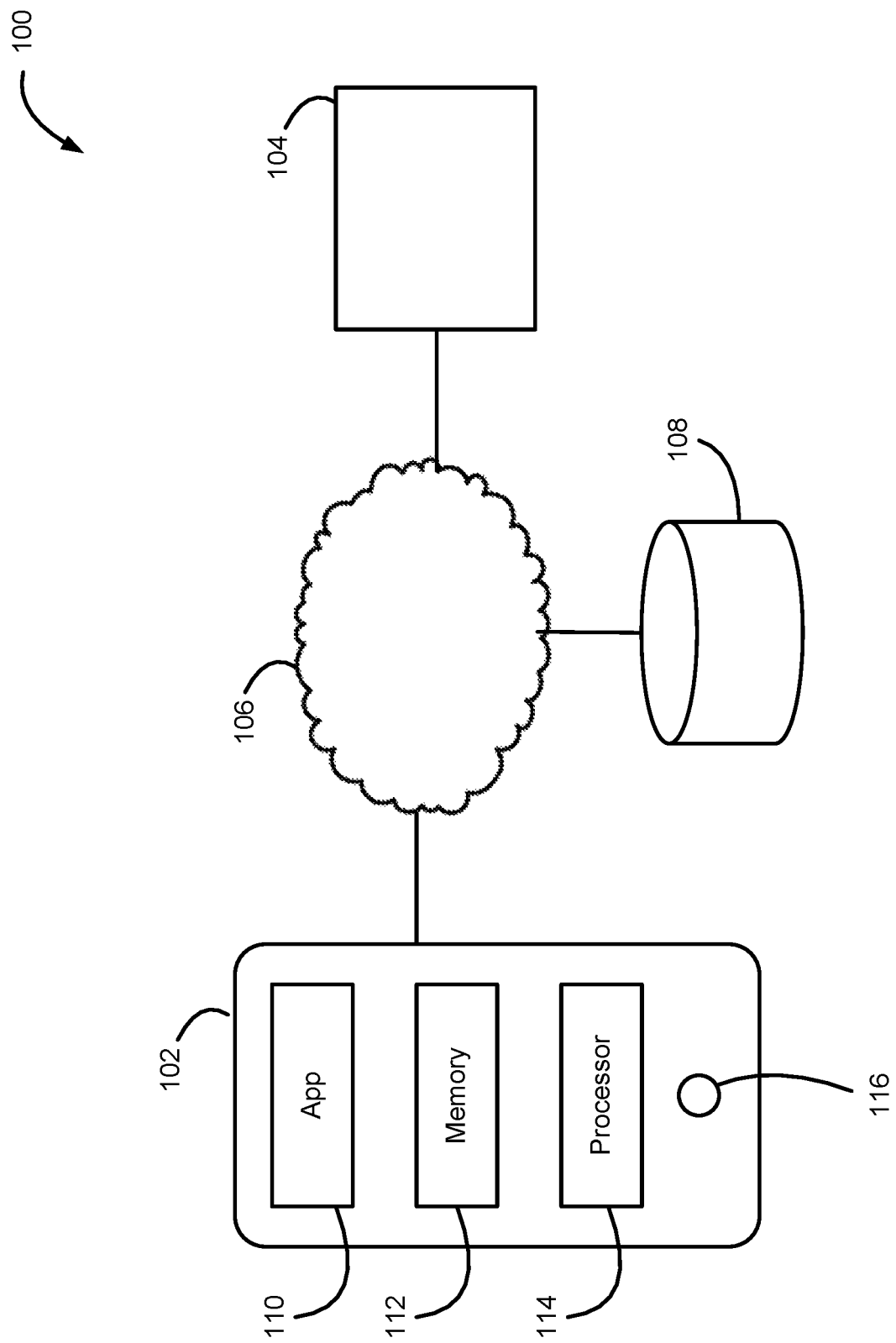
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. Electronic communication system 100 includes one or more communication devices 102; a DTMF-enabled system 104; a network 106; and optionally a database 108.

Communication device 102 can be or include any suitable device with wired or wireless communication features that can connect to network 106. For example, communication device 102 can be or include a wearable device, a tablet computer, a wired phone, a mobile phone, a personal (e.g., laptop or desktop) computer, a streaming device, such as a game console or other media streaming device, or the like.

Communication device 102 includes a speech-to-tone application 110, memory 112, and a processor 114 to perform various functions set forth herein. For example, speech-to-tone application 110, memory 112, and processor 114 can be used to cause spoken words received on a microphone 116 of communication device 102 to be converted to DTMF tones and to cause the DTMF tones to be transmitted to DTMF-enabled system 104 using wired and/or wireless communication protocols. In accordance with further examples of the disclosure, such DTMF signals may not be sent to a speaker on device 102, so as to mitigate distraction of a user of device 102.

Communication device 102 can be configured to determine when a communication, such as a phone call, is initiated and upon detecting that the communication is initiated, automatically launch speech-to-tone application 110. For example, communication device 102 and speech-to-tone application 110 can be configured to automatically launch speech-to-tone application 110 when a dialing application is initiated, when a communication application is launched, when a phone number in a database, such as database 108, is dialed, when a communication is established, when information is transmitted to a speaker on the communication device using a communication application, or after a communication is established and a silent period greater than a predetermined time (e.g., 1, 2, 3, 4, or 5 seconds) is detected during an established call. By not continually running the application on communication device 102, battery power of communication device 102 can be preserved.

Speech-to-tone application 110 can be a stand-alone application that overlays a communication application, such as a phone application on a communication device. Alternatively, speech-to-tone application 110 can form part of the communication application and/or part of an operating system.

Once launched, speech-to-tone application 110 monitors information (e.g., speech) communicated to microphone 116 for predetermined words and converts the predetermined words to DTMF tones for transmission to DTMF-enabled system 104. By way of examples, speech-to-tone application 110 can monitor information on microphone 116 for numbers 0 through 9, star, and pound or hashtag. If any of these words are spoken during a communication, corresponding DTMF tones are transmitted using device 102. Conversely, speech-to-tone application 110 may not convert other words to DTMF tones, such that only relevant DTMF tones are sent to DTMF-enabled system 104.

In accordance with exemplary embodiments of the disclosure, speech-to-tone application 110 is configured to recognized pre-defined words, such as numbers and/or symbols located on a touch-tone device. The predefined words can be stored in memory 112. In some cases, speech-to-tone application 110 is configured to only recognize such numbers and symbols, to reduce an amount of memory storage space used by speech-to-tone application 110. In some cases, speech-to-tone application 110 additionally or alternatively recognizes individual letters of an alphabet. The words can be in one or more languages.

Speech-to-tone application 110 can be further configured to monitor a communication for a word or a string of words that correspond to information stored in database 108. When the word(s) are detected, corresponding information can be pulled from database 108. For example, a string of words, such as "check bank balance" can correspond to a string of numbers and/or symbols, and the corresponding DTMF tones can be transmitted using communication device 102. As described in more detail below, database 108 can be part of device 102 or be elsewhere and accessible by device 102.

Memory 112 can include a random access memory (RAM) or another type of dynamic storage device that stores information and instructions for execution by processor 114. Memory 112 can also include a read-only memory (ROM) or another type of static storage device that stores static information and instructions for processor 114. Memory 112 may further include other types of magnetic or optical recording medium and its corresponding drive for storing information and/or instructions.

Processor 114 can include one or more processing units or microprocessors that interpret and execute coded instructions. In other implementations, processor 114 may be implemented by or include one or more application-specific integrated circuits (ASICs), field programmable gate arrays (FPGAs), or the like.

DTMF-enabled system 104 can include a DTMF decoder that can receive DTMF signals from device 102 and convert the DTMF signals into information, such as numbers and symbols that can be used by DTMF-enabled system 104. By way of examples, DTMF-enabled system 104 can be or include an IVR system that can be used to allow customers to input information using DTMF tones.

Network 106 can include or be, for example, an internet protocol (IP) network. Exemplary types of networks suitable for network 106 include a local area network, a wide-area network, a metropolitan area network, wireless networks, or the Internet. Various components of network 106 can be coupled to one or more other components using an Ethernet connection, other wired connections, and/or wireless interfaces. Network 106 can be coupled to other networks and/or to other devices typically coupled to networks. By way of particular examples, network 106 can include a communication network. Additionally or alternatively, system 100 can also include a private branch exchange (PBX), a Public Switched Telephone Network (PSTN) and/or mobile network to allow one or more of devices 102 to couple to DTMF-enabled system 104.

Database 108 can include one or more devices, such as computers or servers to store user information, numbers, information corresponding to DTMF tones, and/or one or more words associated with a string of numbers and/or symbols of a keypad of a communication device (e.g. a phone). Although separately illustrated, database 108 can form part of communication device 102 or network 106. If separate from device 102, application 110 can retrieve information in database 108.

Figure 2:
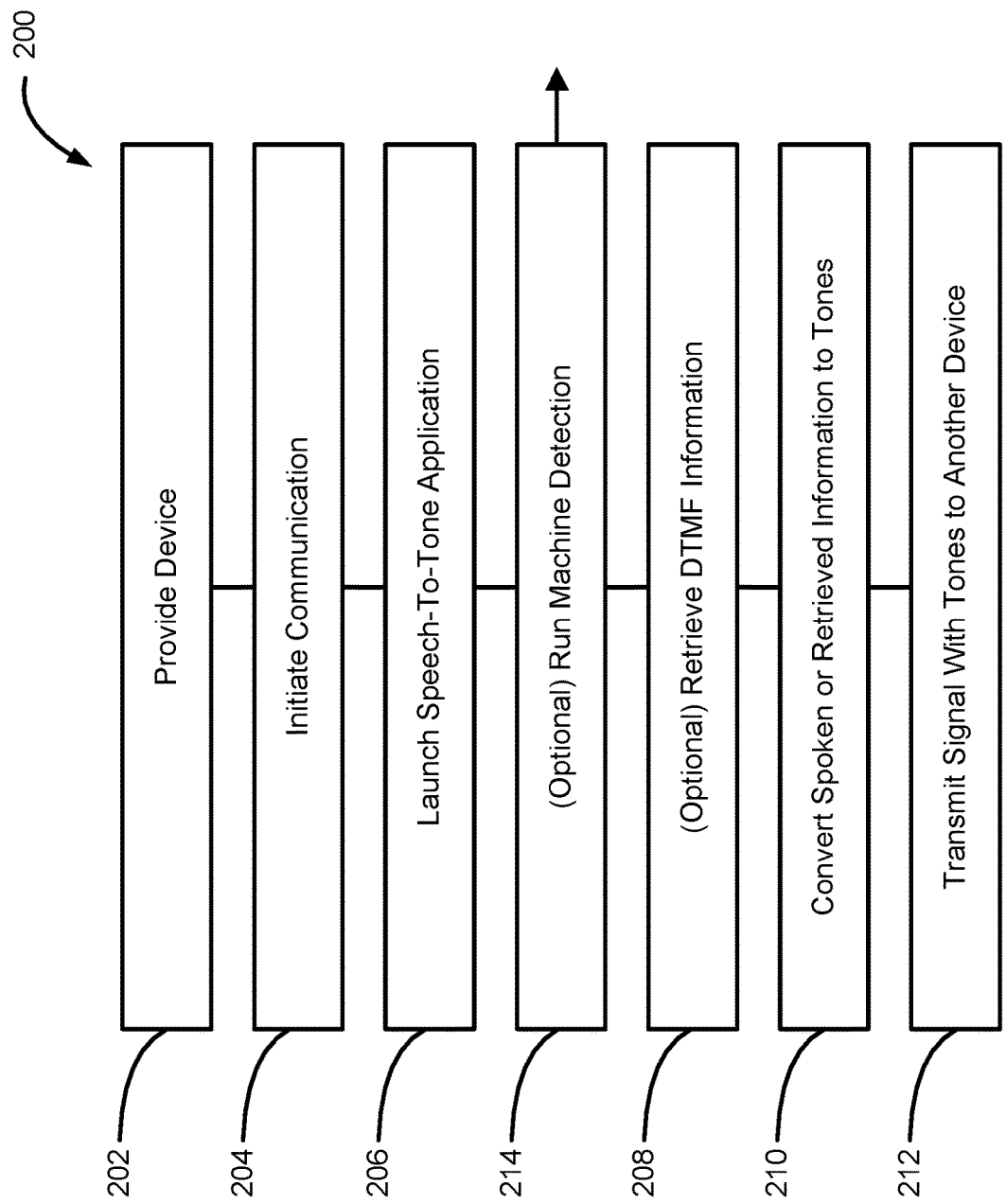
FIG. 2 illustrates an electronic communication method in accordance with exemplary embodiments of the disclosure.

Turning now to FIG. 2, an electronic communication method 200 in accordance with various embodiments of the disclosure is illustrated. Electronic communication method 200 includes the steps of providing a communication device (step 202); using the communication device, determining when a communication is initiated (step 204); upon detecting initiation of the communication, automatically launching a speech-to-tone application on the communication device (step 206); using the speech-to-tone application, during the communication, (optional) determining when pre-defined words are spoken and retrieving corresponding information from a database (step 208); (optional) running machine detection (step 214); performing one or more of converting the pre-defined words to a signal comprising a tone using the communication device and converting a stored key sequence to a signal comprising a tone using the communication device (step 210); and using the communication device, transmitting the signal to another device (step 212).

Step 202 can include providing any suitable communication device that includes an application to perform various steps described herein. Suitable communication devices include communication devices 102 described above.

During step 204, the communication device determines when a communication is initiated. By way of examples, a communication can be initiated when a communication application is started, when a phone application is activated, when a communication is connected—e.g., when the communication device communicatively connects with another device, or using other techniques, such as those described above in connection with FIG. 1.

Once the communication is established, the speech-to-tone application is launched (step 206). In accordance with some examples of the disclosure, the speech-to-tone application is automatically launched once a determination is made that a communication has initiated. However, in accordance with other examples, the speech-to-tone application may not launch until after a communication has been established and thereafter after a predetermined amount of time, such as described above, has passed with no response from a user of the communication device. This silence can be a trigger to call the speech-to-tone application. Alternatively, the application can be manually opened by a user.

Figure 3:
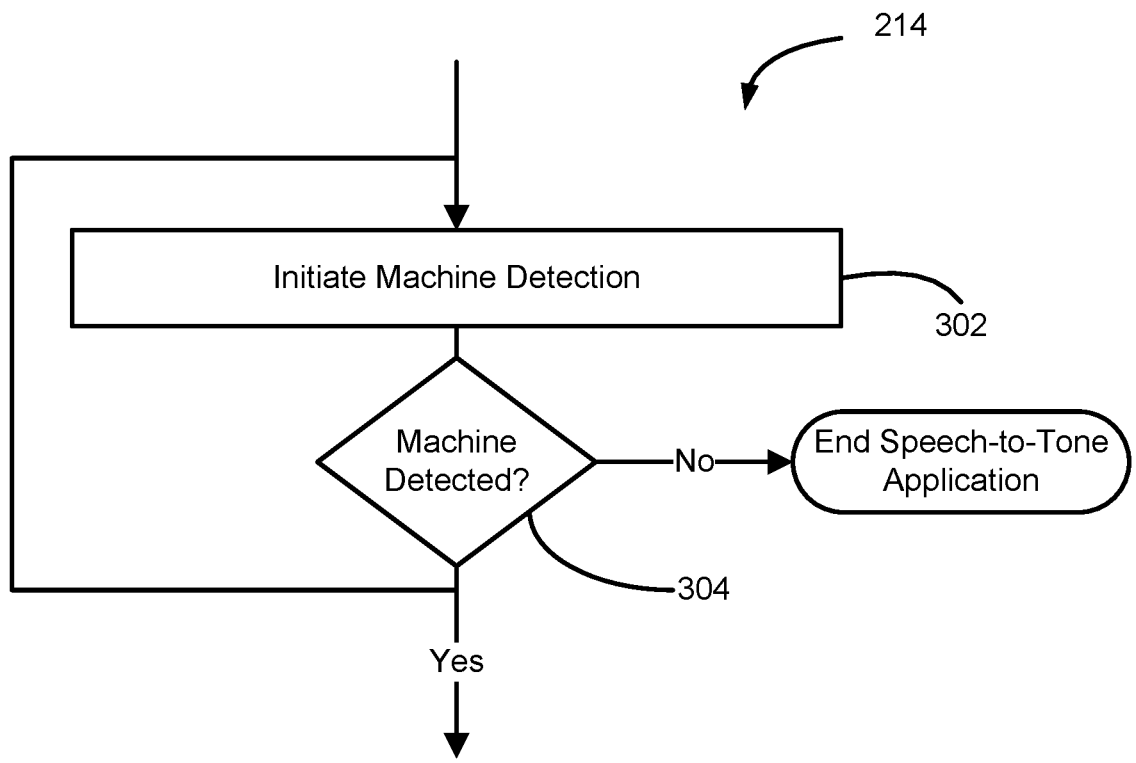
FIG. 3 illustrates a portion of the electronic communication method illustrated in FIG. 2 in greater detail.

Electronic communication method 200 optionally includes a step of running machine detection to determine whether a machine that is waiting for a DTMF response is or such a machine is likely is connected to the communication (step 214). FIG. 3 illustrates optional step 214 in greater detail. Step 214 can include a sub step 302 of initiating machine detection (step 302) and a sub step of determining whether a machine, such as an IVR is detected (step 304). When step 214 is employed, step 302 can automatically launch when or soon after step 206. For example, the speech-to-tone application can cause the machine detection (which can be part of the speech-to-tone application) to launch. Step 304 can be configured to determine whether a machine (e.g., an IVR) is detected periodically—e.g., every 30 seconds, minute, 90 seconds, two minutes, or the like.

As illustrated, step 214 can include repeating steps 302 and 304 until at step 304, it is determined that a machine is not connected to the communication. For example, a period of time, such as 30 seconds, a minute, 90 seconds, two minutes, or the like without a machine connected to the communication is detected. Steps 302 and 304 can be repeating in the background while method 200 proceeds to steps 208-212. Once step 213 determines that no machine is connected to the communication, the speech-to-text application may be terminated to save power of the communication device.

Exemplary systems and methods for detecting whether a machine, such as an IVR is connected to a communication are disclosed in Great Britain Publication No. GB2293723B, Great Britain Publication No. GB2513924A, and PCT Publication No. WO2013154972A1, the relevant contents of which are hereby incorporated herein by reference to the extent such contents do not conflict with the present disclosure.

During optional step 208, number and/or symbol strings corresponding to words received by a microphone on a communication device are retrieved from a database, such as database 108. For example, a user may speak "check voicemail" into a microphone (e.g., microphone 116) of a communication device, and the speech-to-tone application on the communication device can cause to be retrieved a string of numbers and/or symbols, such as those found on the communication device, and cause those numbers and/or symbols to be converted to DTMF tones. Additionally or alternatively, information corresponding to the DTMF tones can be store in a database, such as database 108.

Once the speech-to-tone application is launched, during a communication, the speech-to-tone application detects predetermined words (step 210), such as numbers, symbols, and/or letters typically found on a keypad of a communication device, and causes the communication device to generate DTMF tones (or other tone, generally referred to herein as tone or tones) corresponding to the spoken words. In accordance with aspects of these embodiments, only words received by a microphone on the communication device are converted to DTMF tones. For example, words received on a speaker of the communication device, but not on the microphone of the communication device, are not converted to DTMF tones.

During step 212, the generated DTMF (or other) tones are transmitted to a DTMF-enabled system using the communication—i.e., the same communication initiated during step 204. In accordance with various aspects of these embodiments, the DTMF tones are not transmitted to a speaker on the communication device, so that the user is not distracted during the communication.

The speech-to-tone application can tear down after a period (e.g., greater than about 10 or 20 seconds) of silence or when the communication ends. This may be particularly useful when electronic communication method 200 does not include optional step 214.

Using the systems and methods described above, users are able to interact with the DTMF-enabled system that may not have voice recognition and without having to press keys on a keypad.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. For example, although various examples are described above in connection with DTMF tones, other tones may be transmitted or stored in lieu of or in addition to the DTMF tones. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. An electronic communication method comprising the steps of:
   providing a communication device;
   using the communication device, determining when a communication is initiated;
   upon detecting initiation of the communication, automatically launching a speech-to-tone application on the communication device;
   using the speech-to-tone application, during the communication, determining when pre-defined words are spoken;
   performing one or more of converting the pre-defined words to a signal comprising a tone using the communication device and converting a stored key sequence to a signal comprising a tone using the communication device;
   using the communication device running machine detection to determine whether a machine is waiting for a DTMF response or the machine is connected to the communication; and
   using the communication device, transmitting the signal to the machine,
   wherein the step of detecting initiation of the communication comprises detecting one or more of initiating a dialing application, a number being dialed, when a phone application is launched, launching a communication application, dialing a phone number, when a communication is established between the communication device and another device, when information is transmitted to a speaker on the communication device using the communication application, and after an initial communication is established, determining a silent period greater than a predetermined time during the established communication.

2. The electronic communication method of claim 1, wherein the pre-defined words consist of words corresponding to numbers and symbols.

3. The electronic communication method of claim 1, wherein the pre-defined words consist of words corresponding to keypad numbers and symbols.

4. The electronic communication method of claim 1, wherein the sequence is stored on the communication device.

5. The electronic communication method of claim 1, wherein the sequence is stored on a remote device.

6. The electronic communication method of claim 1, wherein the pre-defined words comprise words corresponding to symbols.

7. The electronic communication method of claim 1, wherein an operating system on the communication device comprises the application.

8. The electronic communication method of claim 1, wherein the step of determining when a communication is initiated comprises detecting a number being dialed.

9. The electronic communication method of claim 1, wherein the step of determining when a communication is initiated comprises determining when a communication is established between the communication device and another device.

10. The electronic communication method of claim 1, wherein the step of determining when a communication is initiated comprises determining when information is transmitted to a speaker on the communication device using the communication application.

11. The electronic communication method of claim 1, wherein the step of determining when a communication is initiated comprises determining when a phone application is launched.

12. The electronic communication method of claim 1, further comprising:
   accessing a database comprising the key sequence and an associated phone number; and
   detecting when the phone number is dialed.

13. A communication device comprising:
   at least one processor; and
   a memory operatively coupled to the processor, the memory storing program instructions that when executed by the processor, causes the processor to:
   determine when a communication is initiated;
   upon detecting initiation of the communication, automatically launching a speech-to-tone application on the communication device;
   determine when pre-defined words are spoken;
   perform one or more of converting the pre-defined words to a signal comprising a tone using the communication device and converting a stored key sequence to a signal comprising a tone using the communication device;
   using the communication device running machine detection to determine whether a machine that is waiting for a DTMF response or the machine is connected to the communication; and
   transmit the signal to the machine,
   wherein detecting initiation of the communication comprises detecting one or more of initiating a dialing application, a number being dialed, when a phone application is launched, launching a communication application, dialing a phone number, when a communication is established between the communication device and another device, when information is transmitted to a speaker on the communication device using the communication application, and after an initial communication is established, determining a silent period greater than a predetermined time during the established communication.

14. The communication device of claim 13, further comprising a database comprising the key sequence.

15. The communication device of claim 14, wherein the database comprises a phone number corresponding to the key sequence.

16. A system comprising the communication device of claim 13.

17. The system of claim 16, further comprising an interactive voice response server.

18. The system of claim 16, further comprising a database comprising the key sequence.

19. The system of claim 18, further comprising a network coupled between the communication device and a DTMF-enabled system.

20. The system of claim 18, further comprising a server comprising the database.

21. The electronic communication method of claim 1, wherein the machine is an Interactive voice response (IVR) system.

* * * * *